(12) United States Patent
Zha

(10) Patent No.: US 12,209,494 B2
(45) Date of Patent: Jan. 28, 2025

(54) SYSTEM AND METHOD FOR DETECTING DOWNHOLE EVENTS

(71) Applicant: ConocoPhillips Company, Houston, TX (US)

(72) Inventor: Yang Zha, Houston, TX (US)

(73) Assignee: ConocoPhillips Company, Houston, TX (US)

(*) Notice: Subject to any disclaimer, the term of this patent is extended or adjusted under 35 U.S.C. 154(b) by 835 days.

(21) Appl. No.: 16/295,291

(22) Filed: Mar. 7, 2019

(65) Prior Publication Data
US 2019/0277135 A1    Sep. 12, 2019

Related U.S. Application Data

(60) Provisional application No. 62/640,951, filed on Mar. 9, 2018.

(51) Int. Cl.
*E21B 49/00* (2006.01)
*G06N 3/04* (2023.01)

(52) U.S. Cl.
CPC ......... *E21B 49/003* (2013.01); *G06N 3/0418* (2013.01)

(58) Field of Classification Search
CPC ...... E21B 49/003; E21B 47/12; G06N 3/0418
See application file for complete search history.

(56) References Cited

U.S. PATENT DOCUMENTS

| | | | | |
|---|---|---|---|---|
| 4,207,619 A * | 6/1980 | Klaveness | ............... | E21B 47/14 367/59 |
| 8,798,978 B2 * | 8/2014 | Ertas | ............... | E21B 44/00 73/152.47 |
| 8,857,510 B2 * | 10/2014 | Rasmus | ............... | E21B 47/04 175/45 |
| 2012/0118637 A1 | 5/2012 | Wang et al. | | |
| 2012/0130693 A1 * | 5/2012 | Ertas | ............... | E21B 44/00 703/2 |
| 2013/0090855 A1 * | 4/2013 | Rasmus | ............... | E21B 34/06 702/9 |
| 2014/0324743 A1 * | 10/2014 | Lakshminarayan | ..... | G06N 7/00 706/58 |

(Continued)

FOREIGN PATENT DOCUMENTS

WO    WO-2018029454 A1    2/2018

OTHER PUBLICATIONS

G. Thornhauser and et al., "Use of Real-Time Rig-Sensor Data To Improve Daily Drilling Reporting, Benchmarking, and Planning—A Case Study", 2006 SPE Intelligent Energy Conference and Exhibition held in Amsterdam, The Netherlands, Apr. 11-13, 2006 (Year: 2006).*

(Continued)

*Primary Examiner* — Douglas Kay
(74) *Attorney, Agent, or Firm* — Polsinelli PC

(57) ABSTRACT

A method is provided to determine and mitigate one or more downhole events of a drill string in a wellbore. The method includes receiving, via a processor, drilling data from one or more surface sensors. The drilling data is processed into a plurality of segments. Each of the plurality of segments are processed by a pre-trained model such that one or more labels are determined. The one or more labels are relating to one or more downhole events corresponding to each of the plurality of segments.

20 Claims, 10 Drawing Sheets

(56) References Cited

U.S. PATENT DOCUMENTS

| | | | | |
|---|---|---|---|---|
| 2015/0106015 | A1* | 4/2015 | Dashevskiy | G01M 13/00 |
| | | | | 702/6 |
| 2015/0247396 | A1* | 9/2015 | Tunc | E21B 44/02 |
| | | | | 700/275 |
| 2016/0115778 | A1* | 4/2016 | Van Oort | G06N 20/00 |
| | | | | 175/27 |
| 2016/0333673 | A1* | 11/2016 | Anno | E21B 44/04 |
| 2017/0152741 | A1 | 6/2017 | Park et al. | |
| 2020/0332627 | A1* | 10/2020 | Tang | E21B 41/00 |
| 2021/0148213 | A1* | 5/2021 | Madasu | E21B 49/003 |
| 2021/0166115 | A1* | 6/2021 | Yu | G06F 30/27 |

OTHER PUBLICATIONS

V. Shah and W. Gardner, "Design Considerations for a New High Data Rate LWD Acoustic Telemetry System", the SPE Asia Pacific Oil and Gas Conference and Exhibition held in Perth, Australia, Oct. 18-20, 2004 (Year: 2004).*

M. Emami and et al., "Prediction and Identification of Downhole Drilling Vibrations Through an Advanced Drillstring Model", The 2017 AADE National Technical Conference and Exhibition held at the Hilton Houston North Hotel, Houston, Texas, Apr. 11-12, 2017 (Year: 2017).*

Ch. Naville and et al, "Seismic While Drilling (SWD) Techniques with Downhole Measurements, Introduced by IFP and its Partners in 1990-2000", Oil & Gas Science and Technology—Rev. IFP, vol. 59 (2004), No. 4, pp. 371-403 (Year: 2004).*

International Preliminary Report on Patentability for International Application No. PCT/US2019/021144 dated Sep. 24, 2020, 7 pages.

International Search Report and Written Opinion for International Application No. PCT/US2019/021144 dated May 16, 2019, 9 pages.

Supplementary European Search Report for Application No. EP 19 76 3684 dated Nov. 24, 2021 (7 pages).

* cited by examiner

SYSTEM AND METHOD FOR DETECTING DOWNHOLE EVENTS

CROSS-REFERENCE TO RELATED APPLICATION

This application claims the benefit of U.S. Provisional Application Ser. No. 62/640,951, filed Mar. 9, 2018, which is incorporated herein by reference in its entirety.

BACKGROUND

1. Field of the Invention

The present inventive concept relates to a system and method to detect downhole events during a drilling process. In particular, the present inventive concept concerns a system and method related to detecting downhole events during a drilling process using a pre-trained model and drilling data obtained from surface sensors.

2. Description of Related Art

A drill string of a drilling rig can exhibit a variety of downhole events during use that may damage the drill string and the drilling rig. For example, a downhole event may be vibration. One particular type of vibration, known as stick-slip vibration, occurs when a drill bit at a bottom of the drill string is rotating at a different angular speed than a top drive motor at the top of the drill string, which is typically caused by friction in the wellbore. When stick-slip vibration occurs, portions of the drill string can completely stick to the formation, while the upper portion of the drill string continues to rotate. When a portion of the drill string that is stuck overcomes the static friction of the formation, the drill string will suddenly speed up and release the stored energy, which can damage the drill bit, the drill string, and the drilling rig, thereby increasing drilling costs.

Conventional systems attempt to detect downhole events by utilizing sensors provided downhole. This conventional approach is ineffective due to the high cost of deploying and maintaining downhole sensors. Also, it may be difficult and costly to transmit downhole data to the surface in real-time, due to bandwidth constraints. Therefore, downhole data often needs to be pre-processed and key indicators need to be sent up the drill string through mud telemetry for diagnosis, which can incur additional costs.

Additionally, conventional systems attempt to detect downhole events by utilizing surface sensors, but require pre-defined features of the drilling operation, wellbore, and formation.

Accordingly, there is a need for an improved system and method to detect downhole events.

SUMMARY

The present inventive concept provides a system and method for detecting and mitigating downhole events using surface data. The system generally includes one or more surface sensors, a processor, and optionally a non-transitory storage medium and a controller. The system is operable to be used with a drill string in a wellbore to obtain drilling data of the surface sensors on the drill string and determining downhole events using a pre-trained model. The method provides steps to determine and mitigate downhole events using the system. The system of the present inventive concept advantageously only requires data from the surface sensors, thereby improving efficiency of the drilling process.

The aforementioned may be achieved in an aspect of the present inventive concept by providing a method to determine and mitigate one or more downhole events of a drill string in a wellbore. The method may include receiving, via a processor, drilling data from one or more surface sensors. The method may also include processing, via the processor, the drilling data into a plurality of segments. The method may further include processing, via the processor, each of the plurality of segments by a pre-trained model. The method may further include determining, via the processor, one or more labels relating to downhole events corresponding to each of the processed plurality of segments.

The one or more downhole events may include at least one of stick-slip vibration, bit-bounce, whirl, kick, buckling, bit stalling, and/or motor failure. The surface sensors may be positioned on a drill string at a surface of the wellbore. The drilling data may include at least one of surface torque, weight on bit, lateral acceleration, rotations per minute, tension, flow rate, temperature, and/or pressure. The pre-trained model may use a machine learning model. The machine learning model may be a convolutional neural network. The machine learning model may be a recurrent neural network. The machine learning model may be a fully connected deep neural network. The machine learning model may be a convolutional neural network, a recurrent neural network, and/or a fully connected deep neural network.

The method may further include displaying, via a visualization system, the one or more labels to provide notification of the one or more downhole events. The notification may be displayed in real-time.

The method may further include controlling, via a controller, the drill string to mitigate the one or more downhole events. The method may also include pre-training a model with a computing device to recognize one or more downhole events from surface data, where the computing device includes the processor; and providing the computing device with the pre-trained model at a drilling operation, where the computing device is coupled or in communication with one or more surface sensors. The pre-training of the model may further include collecting sample data from one or more sample drilling wells, the sample data including surface data and downhole data; processing the sample data into a plurality of sample segments; labeling each of the plurality of sample segments with one or more labels corresponding to the downhole events; and training the model, where an input includes the plurality of sample segments and an output includes the one or more labels corresponding to the plurality of sample segments. The sample data may be processed such that a time axis corresponds to a sampling rate such that the surface data corresponds to and/or is comparable with the downhole data. The downhole data may include at least one of lateral acceleration, axial acceleration, torque, rotation speed, flow rate, bending moment, and/or weight on bit.

The method may further include categorizing, by the processor, the one or more downhole events as severe or normal.

The aforementioned may be achieved in another aspect of the present inventive concept by providing a system configured to determine and mitigate one or more downhole events of a drill string in a wellbore. The system may include a processor coupled or in communication with one or more surface sensors. The processor may be configured to receive drilling data from the one or more surface sensors; process the drilling data into a plurality of segments; process each of the plurality of segments by a pre-trained model; and determine one or more labels relating to downhole events corresponding to each of the processed plurality of segments.

The downhole events may include at least one of stick-slip vibration, bit bounce, whirl, kick, buckling, bit stalling, and/or motor failure. The surface sensors may be positioned on a drill string at a surface of the wellbore. The drilling data may include at least one of surface torque, weight on bit, lateral acceleration, rotations per minute, tension, flow rate, temperature, and/or pressure. The pre-trained model may use a machine learning model. The machine learning model may be a convolutional neural network, a recurrent neural network, or a fully connected deep neural network. The machine learning model may be a convolutional neural network, a recurrent neural network, and/or a fully connected deep neural network.

The system may further include a visualization system operable to display the one or more labels to provide notifications of the one or more downhole events. The notification may be displayed in real-time.

The system may further include a controller operable to control the drill string to mitigate the one or more downhole events. The processor may be further configured to categorize the one or more downhole events as severe or normal.

The foregoing is intended to be illustrative and is not meant in a limiting sense. Many features of the embodiments may be employed with or without reference to other features of any of the embodiments. Additional aspects, advantages, and/or utilities of the present inventive concept will be set forth in part in the description that follows and, in part, will be apparent from the description, or may be learned by practice of the present inventive concept.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present inventive concept. It should be understood, however, that the present inventive concept is not limited to the precise embodiments and features shown. The accompanying drawings, which are incorporated in and constitute a part of this specification, illustrate an implementation of apparatuses consistent with the present inventive concept and, together with the description, serve to explain advantages and principles consistent with the present inventive concept.

DETAILED DESCRIPTION

Figure 1A:
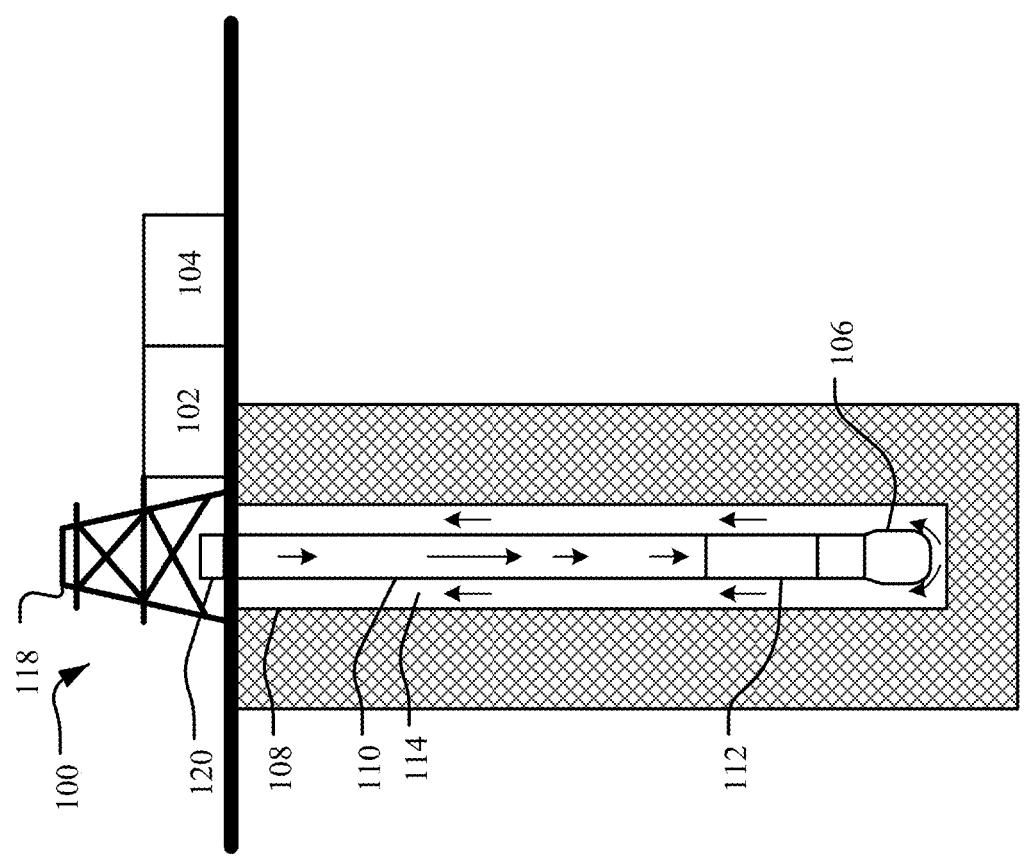
FIG. 1A is a diagram illustrating a system of the present inventive concept with a drilling rig, one or more surface sensors, and supporting facilities in use with a wellbore and drill string.

The following detailed description references the accompanying drawing that illustrates various embodiments of the present inventive concept. The illustration and description are intended to describe aspects and embodiments of the present inventive concept in sufficient detail to enable those skilled in the art to practice the present inventive concept. Other components can be utilized and changes can be made without deviating from the scope of the present inventive concept. The following detailed description is, therefore, not to be taken in a limiting sense. The scope of the present inventive concept is defined only by the appended claims, along with the full scope of equivalents to which such claims are entitled.

I. Terminology

The phraseology and terminology employed herein are for the purpose of description and should not be regarded as limiting. For example, the use of a singular term, such as, "a" is not intended as limiting of the number of items. Also, the use of relational terms such as, but not limited to, "top," "bottom," "left," "right," "upper," "lower," "down," "up," and "side," are used in the description for clarity in specific reference to the figures and are not intended to limit the scope of the present inventive concept or the appended claims. Further, it should be understood that any one of the features of the present inventive concept may be used separately or in combination with other features. Other systems, methods, features, and advantages of the present inventive concept will be, or become, apparent to one with skill in the art upon examination of the figures and the detailed description. It is intended that all such additional systems, methods, features, and advantages be included within this description, be within the scope of the present inventive concept, and be protected by the accompanying claims.

The present disclosure is described below with reference to operational illustrations of methods and devices. It is understood that each operational illustration and combination of operational illustrations can be implemented by means of analog or digital hardware and computer program instructions. The computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the operational illustrations or diagrams.

Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of various steps in a sample order, and are not necessarily meant to be limited to the specific order or hierarchy presented.

For the purposes of this disclosure, "program logic" refers to computer program code and/or instructions in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical, or other form of propagated signals such as carrier waves, infrared signals, or digital signals.

For the purposes of this disclosure, a non-transitory storage medium or computer readable medium (or computer-readable storage medium/media) stores computer data, which data can include program logic (or computer-executable instructions) that is executable by a computer, in machine readable form. By way of example, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For purposes of this disclosure, a "wireless network" should be understood to couple devices with a network. A wireless network may employ stand-alone ad-hoc networks, mesh networks, Wireless LAN (WLAN) networks, cellular networks, or the like. A wireless network may further include a system of terminals, gateways, routers, or the like coupled or in communication by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), North American/CEPT frequencies, radio frequencies, single sideband, radiotelegraphy, radioteletype (RTTY), Bluetooth, 802.11b/g/n, or the like. A wireless network may include virtually any type of wireless communication mechanism by which signals may be communicated between devices, such as a client device or a computing device, between or within a network, or the like.

Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure, as described herein, are not essential for its practice. Likewise, other systems, methods, features, and advantages of the present inventive concept will be, or become, apparent to one with skill in the art upon examination of the figures and the description. It is intended that all such additional systems, methods, features, and advantages be included within this description, be within the scope of the present inventive concept, and be encompassed by the claims.

The term "coupled" is defined as connected, whether directly or indirectly through intervening components, and is not necessarily limited to physical connections. The connection can be such that the objects are permanently connected or releasably connected. The terms "comprising," "including" and "having" are used interchangeably in this disclosure. The terms "comprising," "including" and "having" mean to include, but not necessarily be limited to the things so described. The term "real-time" or "real time" means substantially instantaneously.

Lastly, the terms "or" and "and/or," as used herein, are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture

Figure 1B:
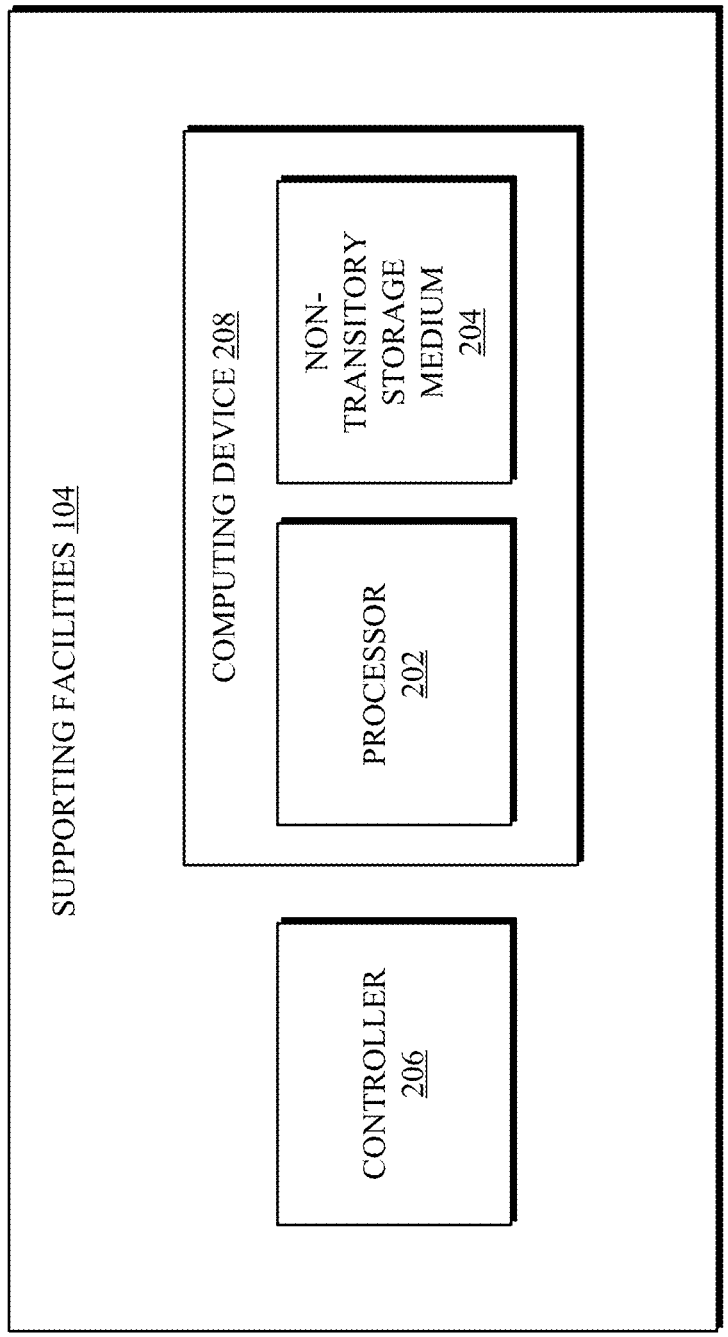
FIG. 1B is a diagram illustrating the supporting facilities of FIG. 1A having a computing device and a controller.

Turning to FIGS. 1A-1B, a system 100 of the present inventive concept is illustrated in use with a drilling rig 118 having a top drive motor 120 at a surface of a wellbore 108. The drilling rig 118 includes a drill string 110 extending into the wellbore 108 with one or more sensors 102 positioned at the surface of the wellbore 108 and supporting facilities 104 positioned at a top of the wellbore 108. The wellbore 108 extends into the ground and is formed via a drilling process using the drill string 110. A depth of the wellbore 108 can range from a few feet to over a mile into the ground and can extend in one or more directions. The drill string 110 includes a drill pipe and a bottom hole assembly (BHA) 112 positioned at a bottom of the drill string 110. The BHA 112 can include a plurality of components. In the exemplary embodiment, the BHA 112 includes a steering unit, a mud motor, a drill motor, a drill collar, and a drill bit 106. It is foreseen that the BHA 112 may include fewer or additional components without deviating from the scope of the present inventive concept. The drill string 110 extends into the wellbore 108 so that the drill bit 106 of the BHA 112 is in contact with a geological formation to crush and/or scrape the geological formation, thereby increasing a length of the wellbore 108 in a downward direction, a lateral direction, and/or any other suitable direction. In the exemplary embodiment, the drill bit 106 is driven by the top drive 120 and/or the mud motor positioned near the drill bit 106.

A drilling mud or a drilling fluid 114 can be continuously circulated within the wellbore 108 via a pump to facilitate operation of the BHA 112, e.g., drilling. The drilling fluid 114 can be introduced into the drill string 110 via an opening of the drill string 110 and pumped down the drill string 110 via the pump. The fluid 114 exits the drill string 110 through the drill bit 106 and circulates upwards through an annulus of the wellbore 108. The fluid 114 has multiple functions including, but not limited to, cooling the drill bit 106, lubricating the drill bit 106, and/or transporting debris generated by the drill bit 106 away from the drill bit 106, e.g., up the annulus of the wellbore 108 and to the surface of the wellbore 108. The fluid 114 may be water, oil, a synthetic based composition, gas, or a combination thereof, and may include one or more additives and/or particles.

The one or more surface sensors 102 are configured to measure drilling data, for example, a surface torque of the drill string 110, and yield drilling data of the drill string torque. It is foreseen that the surface sensors 102 may be configured to measure weight on bit (WOB), lateral acceleration, rotations per minute (RPM), tension, flow rate, temperature, pressure, or any other suitable data related to the drill string 110 during drilling that can be measured from the surface without deviating from the scope of the present inventive concept. It is foreseen that the surface sensors 102 may be, or include, a strain gauge, accelerometer, gyroscope, and/or seismometer without deviating from the scope of the present inventive concept.

In the exemplary embodiment, the surface sensors 102 are positioned on the drill string 110 at or adjacent to the top of the drill string 110 at the surface of the wellbore 108, but it is foreseen that the surface sensors 102 can be positioned along any portion of the drill string 110 proximate to or above the surface of the wellbore 108 without deviating from the scope of the present inventive concept. For instance, it is foreseen that the surface sensors 102 can be in a sub positioned under the top drive 120 without deviating from the scope of the present inventive concept.

The supporting facilities 104, as illustrated in FIG. 1B, include a controller 206 and a computing device 208. The computing device 208 includes a processor 202 and a non-transitory storage medium 204 and can be coupled or in communication with the one or more surface sensors 102. In the exemplary embodiment, the drilling data is transmitted from the surface sensors 102 to the non-transitory storage medium 204 via a wireless connection of a wireless network, although it is foreseen that the drilling data can be transmitted to the non-transitory storage medium 204 via a wired connection, for example a wire and/or optical fiber, without deviating from the scope of the present inventive concept. The non-transitory storage medium 204 tangibly stores the drilling data for processing by the processor 202.

The processor 202 is configured to process the drilling data by executing program logic, which is also stored by the non-transitory storage medium 204. Using the program logic, the processor 202 is configured to determine one or more labels relating to one or more downhole events using the drilling data. In the exemplary embodiment, the one or more downhole events includes at least one of stick-slip vibration, bit-bounce, whirl, kick, buckling, bit stalling, motor failure, and/or any other downhole event which may damage the drill string 110.

Using the program logic, the processor 202 is also configured to determine a severity of each of the one or more downhole events. For example, the processor 202 is configured to determine whether a downhole event is severe 509 or normal 510 (shown in FIG. 5). The processor 202 is then configured to categorize each of the one or more downhole events, where the categories 508 can include severe or normal. In at least one example, one of the one or more downhole events can be categorized into more than two categories. The one or more downhole events can be considered severe if the one or more downhole events can cause damage to the drill string 110. Conversely, the one or more downhole events can be considered normal if the one or more downhole events is within a standard, e.g., at or below a predetermined threshold. For example, one of the one or more downhole events within a standard is an event that may result in standard wear and tear without substantially decreasing the functional life of the drill string and/or its components. Using the program logic, the processor 202 is also configured to determine a controller setting that is effective to reduce at least one of the one or more downhole events via minimization of an objective function, for example, based on a total reflectivity of vibration energy at all of a plurality of vibration modes and a width of an absorption band.

The controller 206 is configured to receive the controller setting from the processor 202, and modify one or more drilling parameters of the drill string 110. For example, the controller 206 can modify the one or more drilling parameters of the drill string 110 via the top drive 120. Other suitable methods of modifying drilling parameters to decrease or prevent the downhole events can also be utilized. In this manner, application of the controller setting via the drill string 110 is effective to reduce the one or more downhole events, for example stick-slip vibration. Regarding the one or more drilling parameters, in the exemplary embodiment, the controller setting is converted to a rotations-per-minute (RPM) command, via the processor 202, which is effective to cause the top drive 120 to rotate the drill string 110 at a speed measured in RPMs. By adjusting the RPM of the top drive 120 using the RPM command, the stick-slip vibration can be mitigated, i.e., at least reduced and preferably eliminated from the drill string 110, via the system 100.

In the exemplary embodiment, the method of utilizing the system 100 includes two parts. A first part (for example, shown in FIG. 2) includes pre-training a model with the computing device 208 to recognize one or more downhole events and/or categorize the one or more downhole events (shown in FIG. 5). A second part (for example, shown in FIG. 6) includes deployment of the model in the computing device 208, for example, at the drilling rig 118 as shown in FIG. 1A, to recognize one or more downhole events and/or categorize the one or more downhole events utilizing drilling data obtained from the one or more surface sensors 102. After deployment of the model in the computing device 208, the system 100 is operable to recognize and/or categorize the one or more downhole events without utilizing any downhole sensors or initial data, e.g., pre-defined features of a drilling operation, system, wellbore, and/or formation. Instead, the system 100 is operable to recognize and/or categorize downhole events using the model and drilling data received from the one or more surface sensors 102 in real-time, thereby reducing costs and improving efficiency.

Figure 2:
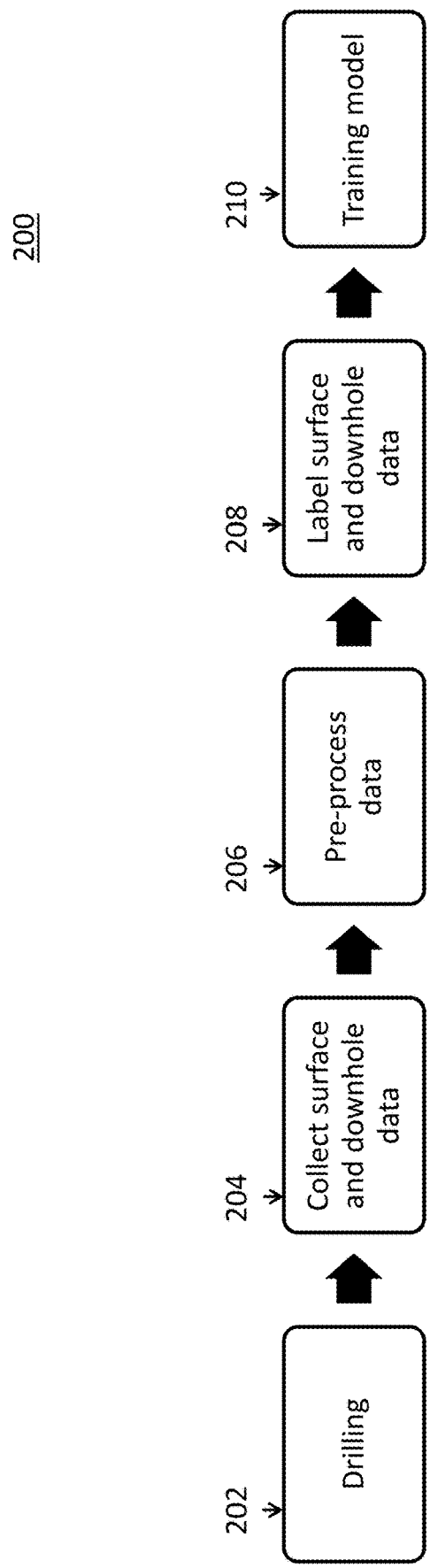
FIG. 2 is a flow chart of a method for pre-training a model.

Referring to FIG. 2, a flowchart is presented in accordance with an example embodiment for pre-training the model to recognize the one or more downhole events and/or to categorize the one or more downhole events, i.e., the first part. The method 200 is provided by way of example, as there are a variety of ways to carry out the method 200. The method 200 described herein can be carried out using the configurations and examples illustrated in FIGS. 1A-1B and 3-5, for example, and various elements of these figures are referenced in explaining the method 200. Each block shown in FIG. 2 represents one or more processes, methods, or subroutines, carried out in the method 200. Furthermore, the illustrated order of blocks is illustrative only and the order of the blocks can change according to the present disclosure. Additional blocks may be added or fewer blocks may be utilized, without deviating from the scope of the present inventive concept. The method 200 can begin at block 202.

At block 202, drilling is performed at one or more sample drilling wells. The drilling can be conducted by the system 100 or a similar system. For example, the drill string 110 extends into the wellbore 108 so that the drill bit 106 of the BHA 112 is in contact with the geological formation to crush and/or scrape the geological formation, thereby increasing the length of the wellbore 108 in the downward direction, the lateral direction, and/or any other suitable direction. In at least one example, the sample drilling wells may not include the system 100 for which the one or more downhole events will be determined and analyzed in the second part of the method of utilizing the system 100.

At block 204, sample data is collected from the one or more sample drilling wells. Sample data can include surface data and/or downhole data. Downhole data can include lateral acceleration, torque, rotation speed, and/or flow rate. Sample data can also include axial acceleration, bending moment, and/or WOB, among other suitable sample data collectable from the one or more sample drilling wells. In at least one example, drilling may not be performed, and sample data is collected from sample drilling wells from databases. As the one or more sample drilling wells may not include the system 100, no previous knowledge of the system 100 is needed when the computing device is implemented at the drilling rig 118.

At block 206, the sample data, including the surface data and/or the downhole data, can be collected from different sensors and processed. The sample data can be processed to directly correlate with one another. In at least one example, the sample data can be processed such that a time axis corresponds to a sampling rate and such that the surface data corresponds to and/or is comparable with the downhole data.

Figure 3A:
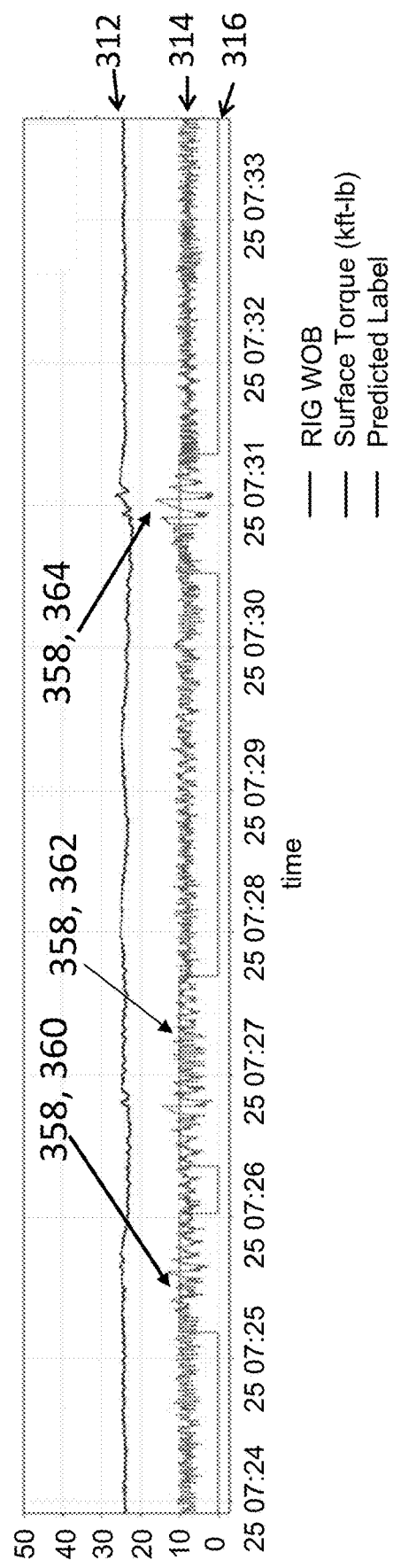
FIGS. 3A-C are diagrams of exemplary graphs of pre-processing data while pre-training the model.
Figure 3B:
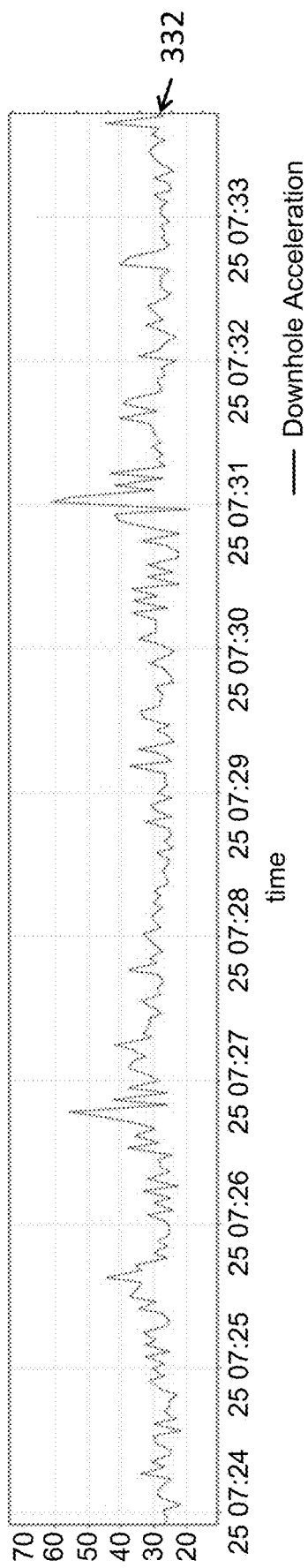
Figure 3C:
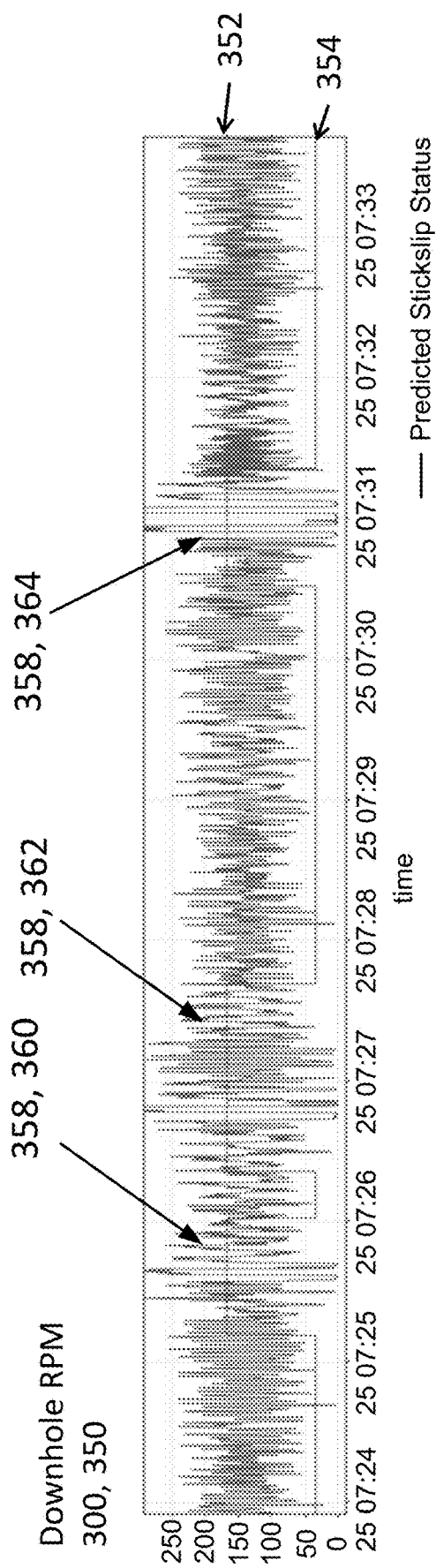

For example, FIGS. 3A-C illustrate sample data 300. The sample data 300 includes surface data 310, shown in FIG. 3A, downhole acceleration 330, shown in FIG. 3B, and downhole RPM 350, shown in FIG. 3C. The sample data 300 may be collected from a variety of sensors including surface and downhole sensors. The surface data 310, downhole acceleration 330, and downhole RPM 350 have been processed such that the time axis is correlated among the sample data 300. The surface data 310 includes WOB 312 and surface torque 314. The downhole acceleration 330 includes a chart of the downhole acceleration 332. The downhole RPM 350 includes a chart of the downhole RPM 352.

The sample data can also be processed into a plurality of sample segments. Each of the plurality of sample segment may be, for example, 30 seconds long or any desired length of time. Each of the plurality of sample segments of surface data and downhole data, at block 208, are labeled with one or more labels corresponding to the one or more downhole events. For example, as shown in FIG. 3C, predicted downhole events 358 are shown in the downhole data as line 354. Line 354, based on the downhole data (in the case of FIG. 3C, downhole RPM 350), predicts downhole events 358 at time frames 360, 362, 364. Correspondingly, in the surface data 310, the one or more downhole events 318 are predicted to be at the time frames 320, 322, 324, as the surface data 310 and the downhole data are correlated.

Further, each of the plurality of segments can include one or more labels. For example, as shown in FIG. 3C, if the downhole RPM 350 exceeds a certain threshold or reaches zero for an extended amount of time during one of the plurality of sample segments, an entirety of the time frames 360, 362, 364 of the sample segment is labeled as including stick-slip vibration. Each of the plurality of sample segments can include more than one label, for example stick-slip vibration and bit-bounce may both occur in one sample segment.

After each of the plurality of sample segments are labeled, a few select channels from the surface data can be retained. For example, channels of surface data to be retained can include torque, RPM, WOB, and acceleration, but other channels of surface data can also be retained. No downhole data is necessary after this step.

Figure 4A:
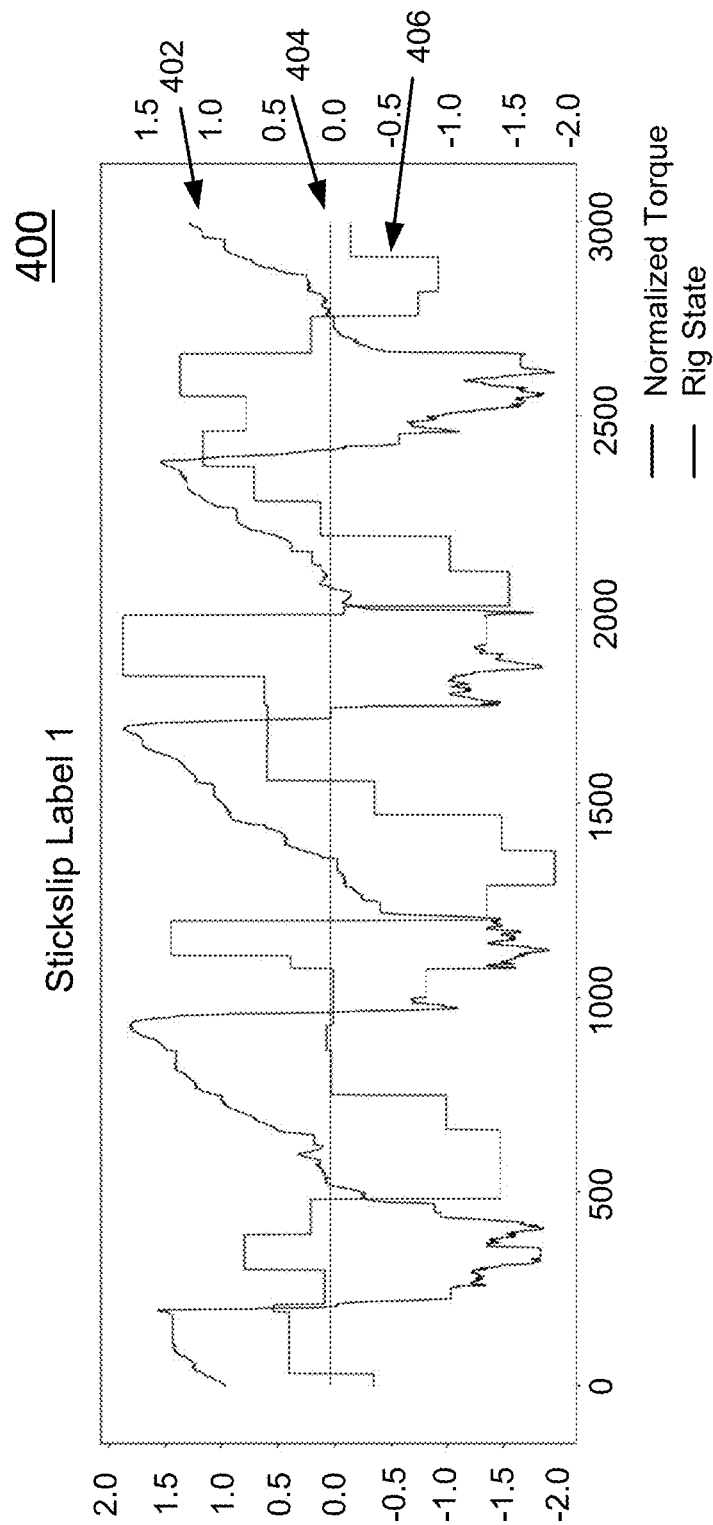
FIGS. 4A and 4B are diagrams of exemplary graphs of determining one or more labels relating to downhole events.
Figure 4B:
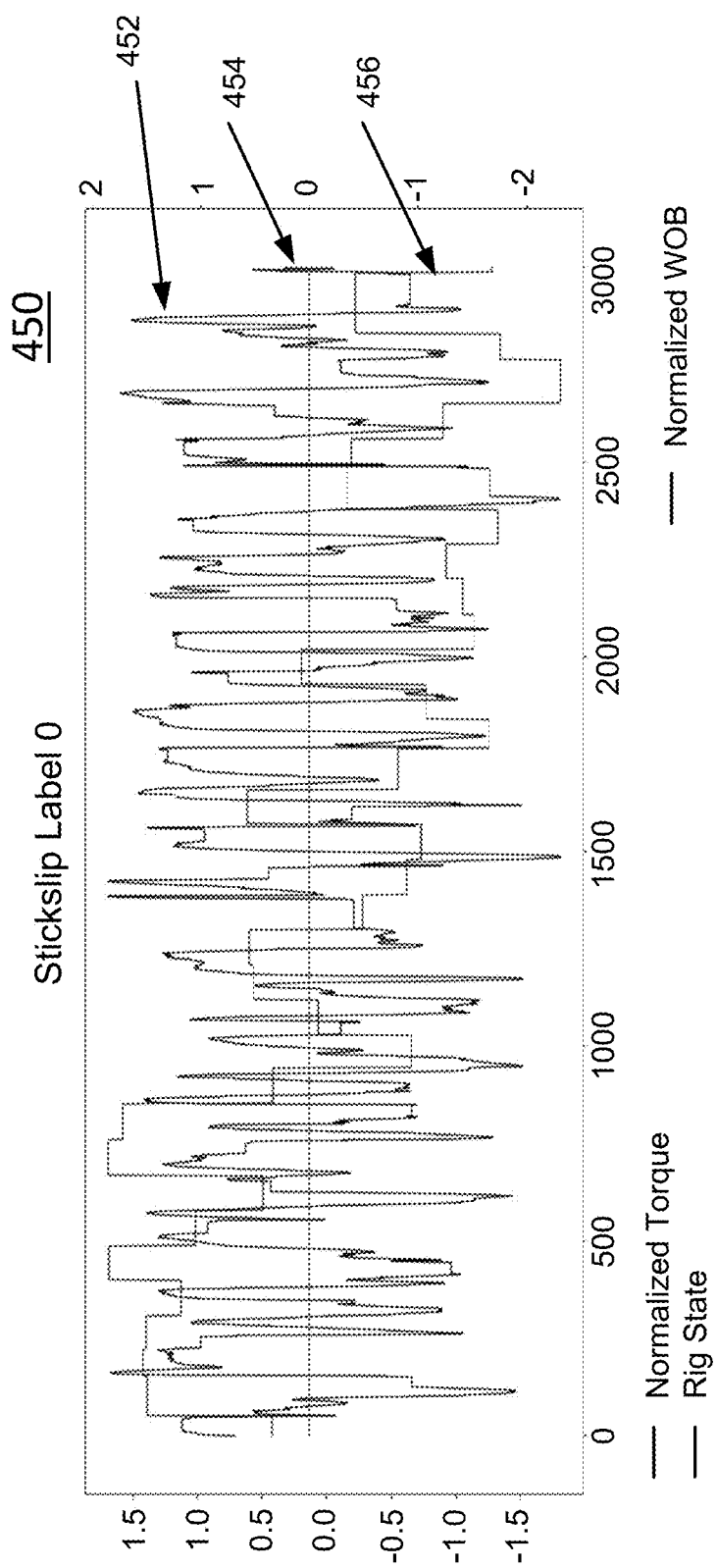

The retained surface data can be further processed to remove the mean and normalized by the standard deviation of the retained surface data. For example, as shown in FIG. 4A, a sample segment 400 is labeled as having a downhole event, in this example, stick-slip vibration. The surface data 402 is torque. The surface data 402 is then processed to remove the mean and normalized by the standard deviation which is shown as line 406. Line 404 illustrates the rig state. As another example, as shown in FIG. 4B, a sample segment 450 is labeled as not including a downhole event. The surface data 452 is WOB. The surface data 452 is processed to remove the mean and normalized by the standard deviation which is shown as line 456. Line 454 illustrates the rig state.

Figure 5:
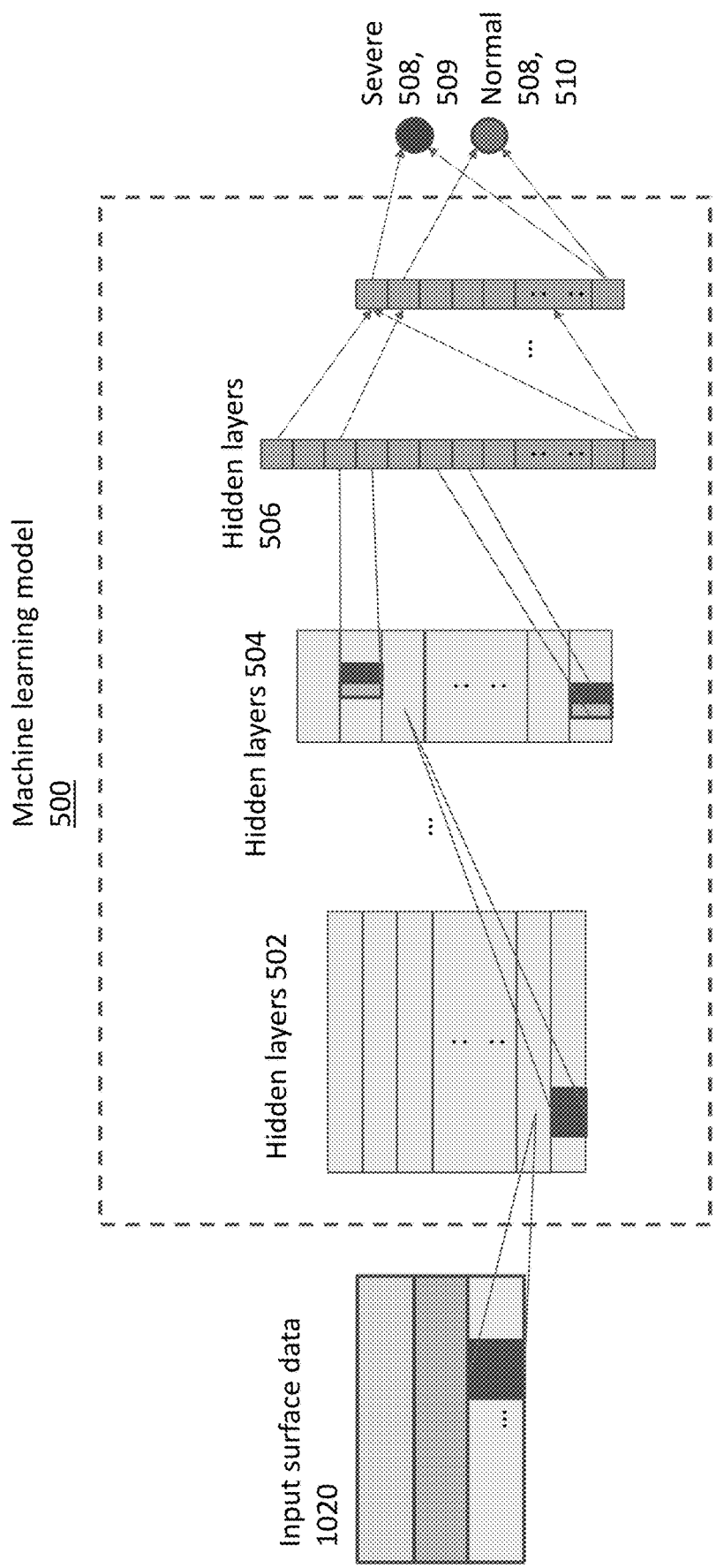
FIG. 5 is a diagram illustrating an exemplary machine learning model.

At block 210, a model is established with training. During training, an input can include the plurality of sample segments (for example, input surface data 1020 as shown in FIG. 5), and an output can include the one or more labels corresponding to the plurality of sample segments. The output can also include categorization of the one or more labels, for example, categories 508 shown in FIG. 5 of severe 509 or normal 510. The model can use a machine learning model, for example machine learning model 500 as shown in FIG. 5. The model can use an artificial neural network, which contains a plurality of layers of neurons with different weights and activation functions to relate the input data to their corresponding labels. In at least one example, the machine learning model can be a convolutional neural network (CNN), In other examples, the machine learning model can be a recurrent neural network, or a fully connected deep neural network. A CNN model may be used as a CNN model is suitable for classification problems such as image and sound recognition. The CNN model can be trained to learn features in the input sample segment that are most related to the one or more labels. The CNN model can have multiple convolutional layers, each of which may perform convolving filters to the input surface data. The output of the previous layer can be input of the next layer. The layers of convolutional filters are part of the model to be learned during the training phase. After applying a desired number of layers of convolutional filters, the data can be resampled and reshaped to a 1D vector. A plurality of fully connected layers of neural networks can then be applied to the intermediate data to yield the final output, which can be a probability of a certain label (for example 0-1). The probability can be rounded to an integer (0 or 1). In at least one example, the probability is not rounded to an integer. The training process can involve iterating over different model parameters (for example weights and filters) in the neural network, so that the predicted one or more labels match the labels from the input surface data 1020.

For example, as shown in FIG. 5, the input surface data 1020 is the input for the machine learning model 500. The input surface data 1020 is filtered by hidden layers 502. The output of hidden layers 502 is the input for hidden layers 504. Similarly, the output of hidden layers 504 is the input for hidden layers 506. This can continue for any desired number of layers. The final output of the machine learning model 500 is one or more labels which can be categorized, for example as severe 509 or normal 510.

During training, a small percentage of data (for example 10% of the data) may be reserved for model validation. The data is not used for training but is used to validate the accuracy of the model after training, thereby preventing the model from overfitting.

It is foreseen that training will be more effective if more data is utilized. During the training of the model, the data can be augmented, for example, by cropping, stretching, or adding noise to existing data to form an augmented data set. The augmented data set can be used to train the model to increase the accuracy and robustness of the model.

Figure 6:
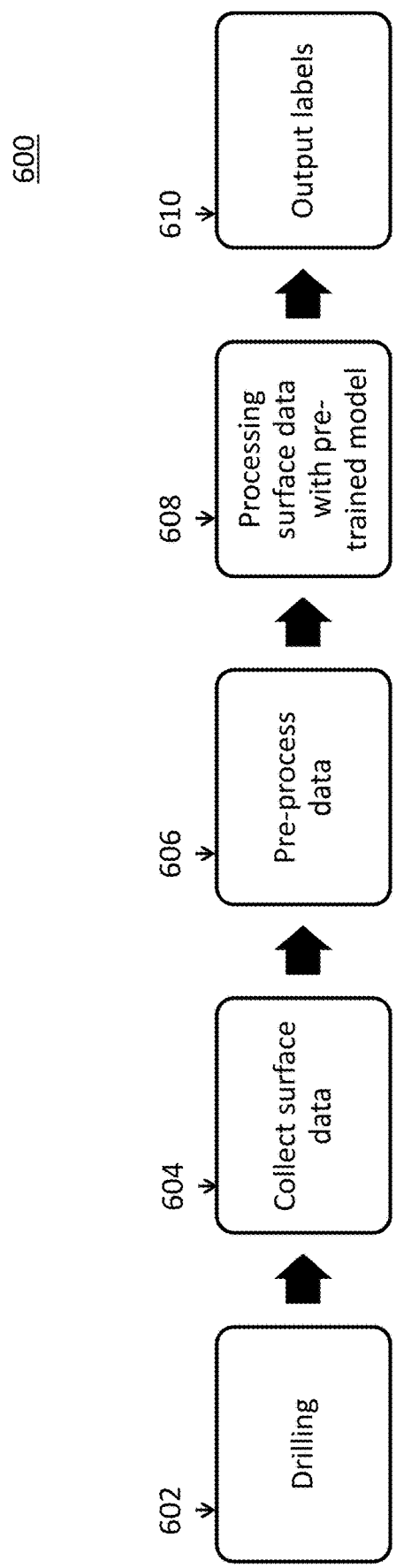
FIG. 6 is a flow chart of a method for processing drilling data.

Referring to FIG. 6, a flowchart is presented in accordance with an example embodiment for deployment of the model in the computing device 208, for example, at the drilling rig 118 as shown in FIG. 1A, to recognize one or more downhole events and/or categorize the one or more downhole events utilizing drilling data obtained from the one or more surface sensors 102, i.e., the second part. The method 600 is provided by way of example, as there are a variety of ways to carry out the method. The method 600 described herein can be carried out using the configurations and examples illustrated in FIGS. 1A-5, for example, and various elements of these figures are referenced in explaining the method 600. Each block shown in FIG. 6 represents one or more processes, methods or subroutines, carried out in the method 600. Furthermore, the illustrated order of blocks is illustrative only and the order of the blocks can change according to the present disclosure. Additional blocks may be added or fewer blocks may be utilized, without deviating from the scope of the present inventive concept. The method 600 can begin at block 602.

At block 602, the computing device 208 with the model which has been trained as discussed herein in relation to FIGS. 2-5 (also referred to as "pre-trained model") is provided at a drilling operation, such as in FIG. 1A. The computing device 208 is coupled or in communication with one or more surface sensors 102. To utilize the computing device 208 with the pre-trained model, no previous information regarding the drilling operation is necessary. Drilling operations are then performed.

At block 604, drilling data is collected from the one or more surface sensors 102. As discussed herein, other data such as data from downhole sensors are not necessary to perform this method. As such, downhole sensors are not necessary, which can save cost and ease of use. The one or more surface sensors 102 are positioned at the surface of the wellbore 108. For example, the one or more surface sensors 102 can be positioned on the top drive 120 or part of the drill string 110 above ground. The drilling data is transmitted to the computing device 208 and received via the processor 202 in the computing device 208.

At block 606, the drilling data is processed via the processor 202. The drilling data is processed into a plurality of segments, similar to the sample segments as discussed above regarding the training method 200.

At block 608, each of the plurality of segments is processed by the pre-trained model. The plurality of segments can be processed substantially in real-time as the drilling data is obtained by and received from the one or more surface sensors 102.

At block 610, one or more labels relating to the one or more downhole events are determined to correspond to each of the processed plurality of segments. As such, each of the plurality of segments may be labeled as including one or more downhole events. For example, one of the plurality of segments may be labeled as including stick-slip vibration, whirl, and/or bit bounce, while another one of the plurality of segments may be labeled as not including any downhole events. The one or more downhole events can further be categorized by the processor 202 with one or more categories, for example as severe or normal.

The one or more labels are displayed via a visualization system to provide a notification of the one or more downhole events to an operator of the system 100. The visualization system can be, for example, a monitor connected to the computing device 208, a mobile device, a laptop, a television, or any suitable visualization system to display notifications. The notification can be displayed in real-time so that the operator can perform any necessary remediation to mitigate damage of the drilling equipment, such as the drill string 110, from the one or more downhole events. For example, if one of the one or more downhole events is categorized as severe, the drilling operation may be modified, e.g., an RPM of the drill string 110 decreased, and/or one or more parts of the drill string 110 may be inspected and/or replaced. Accordingly, to mitigate the damage, the drill string 110 can be controlled, via the controller 206, to mitigate the one or more downhole events.

It will be appreciated by those skilled in the art that changes could be made to the embodiments described above without deviating from the scope of the present inventive concept. It is understood, therefore, that the present inventive concept disclosed herein is not limited to the particular embodiments disclosed, and is intended to cover modifications within the spirit and scope of the present inventive concept.

What is claimed is:

1. A method comprising:
   receiving drilling data captured at a surface of a wellbore using one or more surface sensors positioned at the surface of the wellbore;
   separating the drilling data acquired by the one or more surface sensors into a plurality of segments using at least one processor, the drilling data separated such that a time axis corresponds to a sampling rate and each of the plurality of segments is of a desired number of seconds;
   processing each of the plurality of segments using a pre-trained model by inputting the drilling data of each of the plurality of segments acquired by the one or more surface sensors into the pre-trained model, the pre-trained model trained to recognize one or more downhole events utilizing the drilling data acquired by the one or more surface sensors, the pre-trained model is a machine learning model using an artificial neural network having a plurality of layers;

determining, using the pre-trained model, one or more labels for each of the plurality of segments, the one or more labels relating to the one or more downhole events;

labeling each of the plurality of segments using the one or more labels corresponding to the one or more downhole events;

displaying, via a display of a computing device, a notification based on the labeling, the notification indicating the one or more downhole events can cause damage to a drill string; and controlling the drill string based on the notification to mitigate the damage.

2. The method of claim 1, wherein the one or more surface sensors are positioned on the drill string.

3. The method of claim 1, wherein the one or more downhole events include at least one of stick-slip vibration, bit-bounce, whirl, kick, buckling, bit stalling, or motor failure.

4. The method of claim 1, wherein the drilling data includes at least one of surface torque, weight on bit, lateral acceleration, rotations per minute, tension, flow rate, temperature, or pressure.

5. The method of claim 1, wherein the machine learning model is a convolutional neural network, a recurrent neural network, a fully connected deep neural network, or a custom combination thereof.

6. The method of claim 1, wherein the notification is displayed in real-time.

7. The method of claim 1, wherein the pre-trained model is trained using sample data captured during a drilling operation at one or more sample drilling wells, the sample data including surface data and downhole data.

8. The method of claim 7, wherein an input to the pre-trained model includes a plurality of sample segments and an output includes one or more sample labels corresponding to the plurality of sample segments, the plurality of sample segments obtained by processing the sample data.

9. The method of claim 8, wherein the sample data is processed such that the surface data corresponds to the downhole data.

10. The method of claim 9, wherein the downhole data includes at least one of lateral acceleration, axial acceleration, torque, rotation speed, flow rate, bending moment, or weight on bit.

11. The method of claim 1, further comprising:
categorizing the one or more downhole events as severe or normal.

12. A system comprising:
one or more surface sensors positioned at a surface of a wellbore, the one or more surface sensors configured to measure drilling data at the surface of the wellbore; and
at least one computing device in communication with the one or more surface sensors, the at least one computing device including a processor, the at least one computing device configured to:
separate the drilling data acquired by the one or more surface sensors into a plurality of segments such that a time axis corresponds to a sampling rate and each of the plurality of segments is of a desired number of seconds,
determine one or more labels relating to one or more downhole events using a pre-trained model by inputting the drilling data of each of the plurality of segments acquired by the one or more surface sensors into the pre-trained model, the pre-trained model trained to recognize the one or more downhole events utilizing the drilling data acquired by the one or more surface sensors, the pre-trained model is a machine learning model using an artificial neural network having a plurality of layers,
label each of the plurality of segments using the one or more labels corresponding to the one or more downhole events,
display, via a display of the at least one computing device, the one or more labels to provide a notification that the one or more downhole events can cause damage a drill string,
display, via a display of the at least one computing device, a notification based on labeling of each of the plurality of segments using the one or more labels corresponding to the one or more downhole events, the notification indicating the one or more downhole events can cause damage to a drill string, and
control, via a controller, the drill string based on the notification to mitigate the damage.

13. The system of claim 12, wherein the one or more surface sensors are positioned on the drill string.

14. The system of claim 12, wherein the one or more downhole events include at least one of stick-slip vibration, bit-bounce, whirl, kick, buckling, bit stalling, or motor failure.

15. The system of claim 12, wherein the drilling data includes at least one of surface torque, weight on bit, lateral acceleration, rotations per minute, tension, flow rate, temperature, or pressure.

16. The system of claim 12, wherein the at least one computing device categorizes the one or more downhole events as severe or normal.

17. The system of claim 12, wherein the at least one computing device is configured to display the notification in real-time.

18. The system of claim 12,
wherein,
the pre-trained model is trained using sample data captured during a drilling operation at one or more sample drilling wells,
the sample data is measured using one or more sample sensors,
the sample data includes surface data and downhole data,
the pre-trained model includes an input with a plurality of sample segments and an output with one or more sample labels corresponding to the plurality of sample segments.

19. The system of claim 18, wherein the sample data is processed such that the surface data corresponds to the downhole data.

20. The system of claim 19, wherein the downhole data includes at least one of lateral acceleration, axial acceleration, torque, rotation speed, flow rate, bending moment, or weight on bit.

* * * * *